US009123358B1

(12) United States Patent
Liu et al.

(10) Patent No.: US 9,123,358 B1
(45) Date of Patent: Sep. 1, 2015

(54) CONFORMAL HIGH MOMENT SIDE SHIELD SEED LAYER FOR PERPENDICULAR MAGNETIC RECORDING WRITER

(71) Applicant: Western Digital (Fremont), LLC, Fremont, CA (US)

(72) Inventors: Feng Liu, San Ramon, CA (US); Dehua Han, Fremont, CA (US); Yugang Wang, Milpitas, CA (US); Zhigang Bai, Fremont, CA (US); Tao Pan, San Jose, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 14/246,821

(22) Filed: Apr. 7, 2014

Related U.S. Application Data (62) Division of application No. 13/493,903, filed on Jun. 11, 2012, now Pat. No. 8,724,259.

(51) Int. Cl.
*G11B 5/11* (2006.01)
*G11B 5/23* (2006.01)
*G11B 5/48* (2006.01)

(52) U.S. Cl.
CPC .. *G11B 5/11* (2013.01); *G11B 5/23* (2013.01); *G11B 5/4886* (2013.01)

(58) Field of Classification Search
CPC ..... G11B 5/1278; G11B 5/315; G11B 5/3116
USPC ............... 360/235.4, 125.06, 125.08, 125.11, 360/125.12, 125.13, 125.14, 125.15, 125.3
See application file for complete search history.

(56) References Cited

U.S. PATENT DOCUMENTS

| | | | |
|---|---|---|---|
| 6,016,290 A | 1/2000 | Chen et al. |
| 6,018,441 A | 1/2000 | Wu et al. |
| 6,025,978 A | 2/2000 | Hoshi et al. |
| 6,025,988 A | 2/2000 | Yan |
| 6,032,353 A | 3/2000 | Hiner et al. |
| 6,033,532 A | 3/2000 | Minami |
| 6,034,851 A | 3/2000 | Zarouri et al. |
| 6,043,959 A | 3/2000 | Crue et al. |
| 6,046,885 A | 4/2000 | Aimonetti et al. |
| 6,049,650 A | 4/2000 | Jerman et al. |
| 6,055,138 A | 4/2000 | Shi |
| 6,058,094 A | 5/2000 | Davis et al. |

(Continued)

OTHER PUBLICATIONS

Notice of Allowance dated Dec. 30, 2013 from U.S. Appl. No. 13/493,903, 8 pages.

(Continued)

*Primary Examiner* — Angel Castro (57) ABSTRACT

A perpendicular magnetic recording writer for use in a data storage device, the recording transducer has a magnetic writer pole, a pole tip facing an air bearing surface (ABS). The pole tip has a pole face, leading side wall, a trailing side wall, a first side wall and a second side wall. A trailing side wall nonmagnetic gap layer on the trailing side wall, a first side wall nonmagnetic gap layer deposited on the first side wall, and a second side wall nonmagnetic gap layer deposited on the second side wall. A high magnetic moment seed layer is deposited on the trailing side wall nonmagnetic gap layer, the first side wall nonmagnetic gap layer, and the second side wall nonmagnetic gap layer. In other aspects of the invention shields are provided that have magnetic moments less than the magnetic moment of the seed layers.

17 Claims, 4 Drawing Sheets

ABS View

(56) References Cited

U.S. PATENT DOCUMENTS

| | | | |
|---|---|---|---|
| 6,073,338 | A | 6/2000 | Liu et al. |
| 6,078,479 | A | 6/2000 | Nepela et al. |
| 6,081,499 | A | 6/2000 | Berger et al. |
| 6,094,803 | A | 8/2000 | Carlson et al. |
| 6,099,362 | A | 8/2000 | Viches et al. |
| 6,103,073 | A | 8/2000 | Thayamballi |
| 6,108,166 | A | 8/2000 | Lederman |
| 6,118,629 | A | 9/2000 | Huai et al. |
| 6,118,638 | A | 9/2000 | Knapp et al. |
| 6,125,018 | A | 9/2000 | Takagishi et al. |
| 6,130,779 | A | 10/2000 | Carlson et al. |
| 6,134,089 | A | 10/2000 | Barr et al. |
| 6,136,166 | A | 10/2000 | Shen et al. |
| 6,137,661 | A | 10/2000 | Shi et al. |
| 6,137,662 | A | 10/2000 | Huai et al. |
| 6,160,684 | A | 12/2000 | Heist et al. |
| 6,163,426 | A | 12/2000 | Nepela et al. |
| 6,166,891 | A | 12/2000 | Lederman et al. |
| 6,173,486 | B1 | 1/2001 | Hsiao et al. |
| 6,175,476 | B1 | 1/2001 | Huai et al. |
| 6,178,066 | B1 | 1/2001 | Barr |
| 6,178,070 | B1 | 1/2001 | Hong et al. |
| 6,178,150 | B1 | 1/2001 | Davis |
| 6,181,485 | B1 | 1/2001 | He |
| 6,181,525 | B1 | 1/2001 | Carlson |
| 6,185,051 | B1 | 2/2001 | Chen et al. |
| 6,185,077 | B1 | 2/2001 | Tong et al. |
| 6,185,081 | B1 | 2/2001 | Simion et al. |
| 6,188,549 | B1 | 2/2001 | Wiitala |
| 6,190,764 | B1 | 2/2001 | Shi et al. |
| 6,193,584 | B1 | 2/2001 | Rudy et al. |
| 6,195,229 | B1 | 2/2001 | Shen et al. |
| 6,198,608 | B1 | 3/2001 | Hong et al. |
| 6,198,609 | B1 | 3/2001 | Barr et al. |
| 6,201,673 | B1 | 3/2001 | Rottmayer et al. |
| 6,204,998 | B1 | 3/2001 | Katz |
| 6,204,999 | B1 | 3/2001 | Crue et al. |
| 6,212,153 | B1 | 4/2001 | Chen et al. |
| 6,215,625 | B1 | 4/2001 | Carlson |
| 6,219,205 | B1 | 4/2001 | Yuan et al. |
| 6,221,218 | B1 | 4/2001 | Shi et al. |
| 6,222,707 | B1 | 4/2001 | Huai et al. |
| 6,229,782 | B1 | 5/2001 | Wang et al. |
| 6,230,959 | B1 | 5/2001 | Heist et al. |
| 6,233,116 | B1 | 5/2001 | Chen et al. |
| 6,233,125 | B1 | 5/2001 | Knapp et al. |
| 6,237,215 | B1 | 5/2001 | Hunsaker et al. |
| 6,252,743 | B1 | 6/2001 | Bozorgi |
| 6,255,721 | B1 | 7/2001 | Roberts |
| 6,258,468 | B1 | 7/2001 | Mahvan et al. |
| 6,266,216 | B1 | 7/2001 | Hikami et al. |
| 6,271,604 | B1 | 8/2001 | Frank, Jr. et al. |
| 6,275,354 | B1 | 8/2001 | Huai et al. |
| 6,277,505 | B1 | 8/2001 | Shi et al. |
| 6,282,056 | B1 | 8/2001 | Feng et al. |
| 6,296,955 | B1 | 10/2001 | Hossain et al. |
| 6,297,955 | B1 | 10/2001 | Frank, Jr. et al. |
| 6,304,414 | B1 | 10/2001 | Crue, Jr. et al. |
| 6,307,715 | B1 | 10/2001 | Berding et al. |
| 6,310,746 | B1 | 10/2001 | Hawwa et al. |
| 6,310,750 | B1 | 10/2001 | Hawwa et al. |
| 6,317,290 | B1 | 11/2001 | Wang et al. |
| 6,317,297 | B1 | 11/2001 | Tong et al. |
| 6,322,911 | B1 | 11/2001 | Fukagawa et al. |
| 6,330,136 | B1 | 12/2001 | Wang et al. |
| 6,330,137 | B1 | 12/2001 | Knapp et al. |
| 6,333,830 | B2 | 12/2001 | Rose et al. |
| 6,340,533 | B1 | 1/2002 | Ueno et al. |
| 6,349,014 | B1 | 2/2002 | Crue, Jr. et al. |
| 6,351,355 | B1 | 2/2002 | Min et al. |
| 6,353,318 | B1 | 3/2002 | Sin et al. |
| 6,353,511 | B1 | 3/2002 | Shi et al. |
| 6,356,412 | B1 | 3/2002 | Levi et al. |
| 6,359,779 | B1 | 3/2002 | Frank, Jr. et al. |
| 6,369,983 | B1 | 4/2002 | Hong |
| 6,376,964 | B1 | 4/2002 | Young et al. |
| 6,377,535 | B1 | 4/2002 | Chen et al. |
| 6,381,095 | B1 | 4/2002 | Sin et al. |
| 6,381,105 | B1 | 4/2002 | Huai et al. |
| 6,389,499 | B1 | 5/2002 | Frank, Jr. et al. |
| 6,392,850 | B1 | 5/2002 | Tong et al. |
| 6,396,660 | B1 | 5/2002 | Jensen et al. |
| 6,399,179 | B1 | 6/2002 | Hanrahan et al. |
| 6,400,526 | B2 | 6/2002 | Crue, Jr. et al. |
| 6,404,600 | B1 | 6/2002 | Hawwa et al. |
| 6,404,601 | B1 | 6/2002 | Rottmayer et al. |
| 6,404,706 | B1 | 6/2002 | Stovall et al. |
| 6,410,170 | B1 | 6/2002 | Chen et al. |
| 6,411,522 | B1 | 6/2002 | Frank, Jr. et al. |
| 6,417,998 | B1 | 7/2002 | Crue, Jr. et al. |
| 6,417,999 | B1 | 7/2002 | Knapp et al. |
| 6,418,000 | B1 | 7/2002 | Gibbons et al. |
| 6,418,048 | B1 | 7/2002 | Sin et al. |
| 6,421,211 | B1 | 7/2002 | Hawwa et al. |
| 6,421,212 | B1 | 7/2002 | Gibbons et al. |
| 6,424,505 | B1 | 7/2002 | Lam et al. |
| 6,424,507 | B1 | 7/2002 | Lederman et al. |
| 6,430,009 | B1 | 8/2002 | Komaki et al. |
| 6,430,806 | B1 | 8/2002 | Chen et al. |
| 6,433,965 | B1 | 8/2002 | Gopinathan et al. |
| 6,433,968 | B1 | 8/2002 | Shi et al. |
| 6,433,970 | B1 | 8/2002 | Knapp et al. |
| 6,437,945 | B1 | 8/2002 | Hawwa et al. |
| 6,445,536 | B1 | 9/2002 | Rudy et al. |
| 6,445,542 | B1 | 9/2002 | Levi et al. |
| 6,445,553 | B2 | 9/2002 | Barr et al. |
| 6,445,554 | B1 | 9/2002 | Dong et al. |
| 6,447,935 | B1 | 9/2002 | Zhang et al. |
| 6,448,765 | B1 | 9/2002 | Chen et al. |
| 6,451,514 | B1 | 9/2002 | Iitsuka |
| 6,452,742 | B1 | 9/2002 | Crue et al. |
| 6,452,765 | B1 | 9/2002 | Mahvan et al. |
| 6,456,465 | B1 | 9/2002 | Louis et al. |
| 6,459,552 | B1 | 10/2002 | Liu et al. |
| 6,462,920 | B1 | 10/2002 | Karimi |
| 6,466,401 | B1 | 10/2002 | Hong et al. |
| 6,466,402 | B1 | 10/2002 | Crue, Jr. et al. |
| 6,466,404 | B1 | 10/2002 | Crue, Jr. et al. |
| 6,468,436 | B1 | 10/2002 | Shi et al. |
| 6,469,877 | B1 | 10/2002 | Knapp et al. |
| 6,477,019 | B2 | 11/2002 | Matono et al. |
| 6,479,096 | B1 | 11/2002 | Shi et al. |
| 6,483,662 | B1 | 11/2002 | Thomas et al. |
| 6,487,040 | B1 | 11/2002 | Hsiao et al. |
| 6,487,056 | B1 | 11/2002 | Gibbons et al. |
| 6,490,125 | B1 | 12/2002 | Barr |
| 6,496,330 | B1 | 12/2002 | Crue, Jr. et al. |
| 6,496,334 | B1 | 12/2002 | Pang et al. |
| 6,504,676 | B1 | 1/2003 | Hiner et al. |
| 6,512,657 | B2 | 1/2003 | Heist et al. |
| 6,512,659 | B1 | 1/2003 | Hawwa et al. |
| 6,512,661 | B1 | 1/2003 | Louis |
| 6,512,690 | B1 | 1/2003 | Qi et al. |
| 6,515,573 | B1 | 2/2003 | Dong et al. |
| 6,515,791 | B1 | 2/2003 | Hawwa et al. |
| 6,532,823 | B1 | 3/2003 | Knapp et al. |
| 6,535,363 | B1 | 3/2003 | Hosomi et al. |
| 6,552,874 | B1 | 4/2003 | Chen et al. |
| 6,552,928 | B1 | 4/2003 | Qi et al. |
| 6,562,487 | B1 | 5/2003 | Vas'ko et al. |
| 6,577,470 | B1 | 6/2003 | Rumpler |
| 6,583,961 | B2 | 6/2003 | Levi et al. |
| 6,583,968 | B1 | 6/2003 | Scura et al. |
| 6,597,548 | B1 | 7/2003 | Yamanaka et al. |
| 6,611,398 | B1 | 8/2003 | Rumpler et al. |
| 6,618,223 | B1 | 9/2003 | Chen et al. |
| 6,629,357 | B1 | 10/2003 | Akoh |
| 6,633,464 | B2 | 10/2003 | Lai et al. |
| 6,636,394 | B1 | 10/2003 | Fukagawa et al. |
| 6,639,291 | B1 | 10/2003 | Sin et al. |
| 6,650,503 | B1 | 11/2003 | Chen et al. |
| 6,650,506 | B1 | 11/2003 | Risse |
| 6,654,195 | B1 | 11/2003 | Frank, Jr. et al. |
| 6,657,816 | B1 | 12/2003 | Barr et al. |

(56) References Cited

U.S. PATENT DOCUMENTS

| | | |
|---|---|---|
| 6,661,621 B1 | 12/2003 | Iitsuka |
| 6,661,625 B1 | 12/2003 | Sin et al. |
| 6,674,610 B1 | 1/2004 | Thomas et al. |
| 6,680,863 B1 | 1/2004 | Shi et al. |
| 6,683,763 B1 | 1/2004 | Hiner et al. |
| 6,687,098 B1 | 2/2004 | Huai |
| 6,687,178 B1 | 2/2004 | Qi et al. |
| 6,687,977 B2 | 2/2004 | Knapp et al. |
| 6,691,226 B1 | 2/2004 | Frank, Jr. et al. |
| 6,697,294 B1 | 2/2004 | Qi et al. |
| 6,700,738 B1 | 3/2004 | Sin et al. |
| 6,700,759 B1 | 3/2004 | Knapp et al. |
| 6,704,158 B2 | 3/2004 | Hawwa et al. |
| 6,707,083 B1 | 3/2004 | Hiner et al. |
| 6,713,801 B1 | 3/2004 | Sin et al. |
| 6,721,138 B1 | 4/2004 | Chen et al. |
| 6,721,149 B1 | 4/2004 | Shi et al. |
| 6,721,203 B1 | 4/2004 | Qi et al. |
| 6,724,569 B1 | 4/2004 | Chen et al. |
| 6,724,572 B1 | 4/2004 | Stoev et al. |
| 6,729,015 B2 | 5/2004 | Matono et al. |
| 6,735,850 B1 | 5/2004 | Gibbons et al. |
| 6,737,281 B1 | 5/2004 | Dang et al. |
| 6,744,608 B1 | 6/2004 | Sin et al. |
| 6,747,301 B1 | 6/2004 | Hiner et al. |
| 6,751,055 B1 | 6/2004 | Alfoqaha et al. |
| 6,754,049 B1 | 6/2004 | Seagle et al. |
| 6,756,071 B1 | 6/2004 | Shi et al. |
| 6,757,140 B1 | 6/2004 | Hawwa |
| 6,760,196 B1 | 7/2004 | Niu et al. |
| 6,762,910 B1 | 7/2004 | Knapp et al. |
| 6,765,756 B1 | 7/2004 | Hong et al. |
| 6,775,902 B1 | 8/2004 | Huai et al. |
| 6,778,358 B1 | 8/2004 | Jiang et al. |
| 6,781,927 B1 | 8/2004 | Heanuc et al. |
| 6,785,955 B1 | 9/2004 | Chen et al. |
| 6,791,793 B1 | 9/2004 | Chen et al. |
| 6,791,807 B1 | 9/2004 | Hikami et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,411 B1 | 10/2004 | Lederman et al. |
| 6,803,615 B1 | 10/2004 | Sin et al. |
| 6,806,035 B1 | 10/2004 | Atireklapvarodom et al. |
| 6,807,030 B1 | 10/2004 | Hawwa et al. |
| 6,807,332 B1 | 10/2004 | Hawwa |
| 6,809,899 B1 | 10/2004 | Chen et al. |
| 6,816,345 B1 | 11/2004 | Knapp et al. |
| 6,828,897 B1 | 12/2004 | Nepela |
| 6,829,160 B1 | 12/2004 | Qi et al. |
| 6,829,819 B1 | 12/2004 | Crue, Jr. et al. |
| 6,833,979 B1 | 12/2004 | Knapp et al. |
| 6,834,010 B1 | 12/2004 | Qi et al. |
| 6,859,343 B1 | 2/2005 | Alfoqaha et al. |
| 6,859,997 B1 | 3/2005 | Tong et al. |
| 6,861,937 B1 | 3/2005 | Feng et al. |
| 6,870,712 B2 | 3/2005 | Chen et al. |
| 6,873,494 B2 | 3/2005 | Chen et al. |
| 6,873,547 B1 | 3/2005 | Shi et al. |
| 6,879,464 B2 | 4/2005 | Sun et al. |
| 6,888,184 B1 | 5/2005 | Shi et al. |
| 6,888,704 B1 | 5/2005 | Diao et al. |
| 6,891,702 B1 | 5/2005 | Tang |
| 6,894,871 B2 | 5/2005 | Alfoqaha et al. |
| 6,894,877 B1 | 5/2005 | Crue, Jr. et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,944,938 B1 | 9/2005 | Crue, Jr. et al. |
| 6,947,258 B1 | 9/2005 | Li |
| 6,950,266 B1 | 9/2005 | McCaslin et al. |
| 6,954,332 B1 | 10/2005 | Hong et al. |
| 6,958,885 B1 | 10/2005 | Chen et al. |
| 6,961,221 B1 | 11/2005 | Niu et al. |
| 6,969,989 B1 | 11/2005 | Mei |
| 6,975,486 B2 | 12/2005 | Chen et al. |
| 6,987,643 B1 | 1/2006 | Seagle |
| 6,989,962 B1 | 1/2006 | Dong et al. |
| 6,989,972 B1 | 1/2006 | Stoev et al. |
| 7,006,327 B2 | 2/2006 | Krounbi et al. |
| 7,007,372 B1 | 3/2006 | Chen et al. |
| 7,012,832 B1 | 3/2006 | Sin et al. |
| 7,023,658 B1 | 4/2006 | Knapp et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,035,046 B1 | 4/2006 | Young et al. |
| 7,041,985 B1 | 5/2006 | Wang et al. |
| 7,046,490 B1 | 5/2006 | Ueno et al. |
| 7,054,113 B1 | 5/2006 | Seagle et al. |
| 7,057,857 B1 | 6/2006 | Niu et al. |
| 7,059,868 B1 | 6/2006 | Yan |
| 7,092,195 B1 | 8/2006 | Liu et al. |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,116,517 B1 | 10/2006 | He et al. |
| 7,124,654 B1 | 10/2006 | Davies et al. |
| 7,126,788 B1 | 10/2006 | Liu et al. |
| 7,126,790 B1 | 10/2006 | Liu et al. |
| 7,131,346 B1 | 11/2006 | Buttar et al. |
| 7,133,253 B1 | 11/2006 | Seagle et al. |
| 7,134,185 B1 | 11/2006 | Knapp et al. |
| 7,154,715 B2 | 12/2006 | Yamanaka et al. |
| 7,170,725 B1 | 1/2007 | Zhou et al. |
| 7,177,117 B1 | 2/2007 | Jiang et al. |
| 7,193,815 B1 | 3/2007 | Stoev et al. |
| 7,196,880 B1 | 3/2007 | Anderson et al. |
| 7,199,974 B1 | 4/2007 | Alfoqaha |
| 7,199,975 B1 | 4/2007 | Pan |
| 7,211,339 B1 | 5/2007 | Seagle et al. |
| 7,212,384 B1 | 5/2007 | Stoev et al. |
| 7,238,292 B1 | 7/2007 | He et al. |
| 7,239,478 B1 | 7/2007 | Sin et al. |
| 7,248,431 B1 | 7/2007 | Liu et al. |
| 7,248,433 B1 | 7/2007 | Stoev et al. |
| 7,248,449 B1 | 7/2007 | Seagle |
| 7,263,762 B2 | 9/2007 | Bedell et al. |
| 7,280,325 B1 | 10/2007 | Pan |
| 7,283,327 B1 | 10/2007 | Liu et al. |
| 7,284,316 B1 | 10/2007 | Huai et al. |
| 7,286,329 B1 | 10/2007 | Chen et al. |
| 7,289,303 B1 | 10/2007 | Sin et al. |
| 7,292,409 B1 | 11/2007 | Stoev et al. |
| 7,296,339 B1 | 11/2007 | Yang et al. |
| 7,307,814 B1 | 12/2007 | Seagle et al. |
| 7,307,818 B1 | 12/2007 | Park et al. |
| 7,310,204 B1 | 12/2007 | Stoev et al. |
| 7,318,947 B1 | 1/2008 | Park et al. |
| 7,333,295 B1 | 2/2008 | Medina et al. |
| 7,337,530 B1 | 3/2008 | Stoev et al. |
| 7,342,752 B1 | 3/2008 | Zhang et al. |
| 7,349,170 B1 | 3/2008 | Rudman et al. |
| 7,349,179 B1 | 3/2008 | He et al. |
| 7,354,664 B1 | 4/2008 | Jiang et al. |
| 7,363,697 B1 | 4/2008 | Dunn et al. |
| 7,371,152 B1 | 5/2008 | Newman |
| 7,372,665 B1 | 5/2008 | Stoev et al. |
| 7,375,926 B1 | 5/2008 | Stoev et al. |
| 7,379,269 B1 | 5/2008 | Krounbi et al. |
| 7,386,933 B1 | 6/2008 | Krounbi et al. |
| 7,389,577 B1 | 6/2008 | Shang et al. |
| 7,417,832 B1 | 8/2008 | Erickson et al. |
| 7,419,891 B1 | 9/2008 | Chen et al. |
| 7,428,124 B1 | 9/2008 | Song et al. |
| 7,430,098 B1 | 9/2008 | Song et al. |
| 7,436,620 B1 | 10/2008 | Kang et al. |
| 7,436,638 B1 | 10/2008 | Pan |

(56) References Cited

U.S. PATENT DOCUMENTS

| | | |
|---|---|---|
| 7,440,220 B1 | 10/2008 | Kang et al. |
| 7,443,632 B1 | 10/2008 | Stoev et al. |
| 7,444,740 B1 | 11/2008 | Chung et al. |
| 7,493,688 B1 | 2/2009 | Wang et al. |
| 7,508,627 B1 | 3/2009 | Zhang et al. |
| 7,522,377 B1 | 4/2009 | Jiang et al. |
| 7,522,379 B1 | 4/2009 | Krounbi et al. |
| 7,522,382 B1 | 4/2009 | Pan |
| 7,542,246 B1 | 6/2009 | Song et al. |
| 7,551,406 B1 | 6/2009 | Thomas et al. |
| 7,552,523 B1 | 6/2009 | He et al. |
| 7,554,767 B1 | 6/2009 | Hu et al. |
| 7,583,466 B2 | 9/2009 | Kermiche et al. |
| 7,595,967 B1 | 9/2009 | Moon et al. |
| 7,639,457 B1 | 12/2009 | Chen et al. |
| 7,660,080 B1 | 2/2010 | Liu et al. |
| 7,672,080 B1 | 3/2010 | Tang et al. |
| 7,672,086 B1 | 3/2010 | Jiang |
| 7,684,160 B1 | 3/2010 | Erickson et al. |
| 7,688,546 B1 | 3/2010 | Bai et al. |
| 7,691,434 B1 | 4/2010 | Zhang et al. |
| 7,695,761 B1 | 4/2010 | Shen et al. |
| 7,719,795 B2 | 5/2010 | Hu et al. |
| 7,726,009 B1 | 6/2010 | Liu et al. |
| 7,729,086 B1 | 6/2010 | Song et al. |
| 7,729,087 B1 | 6/2010 | Stoev et al. |
| 7,736,823 B1 | 6/2010 | Wang et al. |
| 7,785,666 B1 | 8/2010 | Sun et al. |
| 7,796,356 B1 | 9/2010 | Fowler et al. |
| 7,800,858 B1 | 9/2010 | Bajikar et al. |
| 7,819,979 B1 | 10/2010 | Chen et al. |
| 7,829,264 B1 | 11/2010 | Wang et al. |
| 7,846,643 B1 | 12/2010 | Sun et al. |
| 7,855,854 B2 | 12/2010 | Hu et al. |
| 7,869,160 B1 | 1/2011 | Pan et al. |
| 7,872,824 B1 | 1/2011 | Macchioni et al. |
| 7,872,833 B2 | 1/2011 | Hu et al. |
| 7,872,835 B2 | 1/2011 | Guan |
| 7,910,267 B1 | 3/2011 | Zeng et al. |
| 7,911,735 B1 | 3/2011 | Sin et al. |
| 7,911,737 B1 | 3/2011 | Jiang et al. |
| 7,916,426 B2 | 3/2011 | Hu et al. |
| 7,918,013 B1 | 4/2011 | Dunn et al. |
| 7,920,359 B2 | 4/2011 | Maruyama et al. |
| 7,968,219 B1 | 6/2011 | Jiang et al. |
| 7,978,431 B2 | 7/2011 | Han et al. |
| 7,979,978 B2 | 7/2011 | Han et al. |
| 7,982,989 B1 | 7/2011 | Shi et al. |
| 7,983,001 B2 | 7/2011 | Sato et al. |
| 8,008,912 B1 | 8/2011 | Shang |
| 8,012,804 B1 | 9/2011 | Wang et al. |
| 8,015,692 B1 | 9/2011 | Zhang et al. |
| 8,018,677 B1 | 9/2011 | Chung et al. |
| 8,018,678 B1 | 9/2011 | Zhang et al. |
| 8,024,748 B1 | 9/2011 | Moravec et al. |
| 8,072,705 B1 | 12/2011 | Wang et al. |
| 8,074,345 B1 | 12/2011 | Anguelouch et al. |
| 8,077,418 B1 | 12/2011 | Hu et al. |
| 8,077,434 B1 | 12/2011 | Shen et al. |
| 8,077,435 B1 | 12/2011 | Liu et al. |
| 8,077,557 B1 | 12/2011 | Hu et al. |
| 8,079,135 B1 | 12/2011 | Shen et al. |
| 8,081,403 B1 | 12/2011 | Chen et al. |
| 8,091,210 B1 | 1/2012 | Sasaki et al. |
| 8,097,846 B1 | 1/2012 | Anguelouch et al. |
| 8,104,166 B1 | 1/2012 | Zhang et al. |
| 8,116,043 B2 | 2/2012 | Leng et al. |
| 8,116,171 B1 | 2/2012 | Lee |
| 8,125,856 B1 | 2/2012 | Li et al. |
| 8,134,794 B1 | 3/2012 | Wang |
| 8,136,224 B1 | 3/2012 | Sun et al. |
| 8,136,225 B1 | 3/2012 | Zhang et al. |
| 8,136,805 B1 | 3/2012 | Lee |
| 8,141,235 B1 | 3/2012 | Zhang |
| 8,146,236 B1 | 4/2012 | Luo et al. |
| 8,149,536 B1 | 4/2012 | Yang et al. |
| 8,151,441 B1 | 4/2012 | Rudy et al. |
| 8,163,185 B1 | 4/2012 | Sun et al. |
| 8,164,760 B2 | 4/2012 | Willis |
| 8,164,855 B1 | 4/2012 | Gibbons et al. |
| 8,164,864 B2 | 4/2012 | Kaiser et al. |
| 8,165,709 B1 | 4/2012 | Rudy |
| 8,166,631 B1 | 5/2012 | Tran et al. |
| 8,166,632 B1 | 5/2012 | Zhang et al. |
| 8,169,473 B1 | 5/2012 | Yu et al. |
| 8,171,618 B1 | 5/2012 | Wang et al. |
| 8,174,790 B2 | 5/2012 | Sasaki et al. |
| 8,179,636 B1 | 5/2012 | Bai et al. |
| 8,189,295 B2 | 5/2012 | Han et al. |
| 8,191,237 B1 | 6/2012 | Luo et al. |
| 8,194,365 B1 | 6/2012 | Leng et al. |
| 8,194,366 B1 | 6/2012 | Li et al. |
| 8,196,285 B1 | 6/2012 | Zhang et al. |
| 8,200,054 B1 | 6/2012 | Li et al. |
| 8,203,800 B2 | 6/2012 | Li et al. |
| 8,208,350 B1 | 6/2012 | Hu et al. |
| 8,220,140 B1 | 7/2012 | Wang et al. |
| 8,222,599 B1 | 7/2012 | Chien |
| 8,225,488 B1 | 7/2012 | Zhang et al. |
| 8,227,023 B1 | 7/2012 | Liu et al. |
| 8,228,633 B1 | 7/2012 | Tran et al. |
| 8,231,796 B1 * | 7/2012 | Li et al. .................... 216/22 |
| 8,233,248 B1 | 7/2012 | Li et al. |
| 8,243,387 B2 | 8/2012 | Yamaguchi et al. |
| 8,248,896 B1 | 8/2012 | Yuan et al. |
| 8,254,060 B1 | 8/2012 | Shi et al. |
| 8,257,597 B1 | 9/2012 | Guan et al. |
| 8,259,410 B1 | 9/2012 | Bai et al. |
| 8,259,539 B1 | 9/2012 | Hu et al. |
| 8,262,918 B1 | 9/2012 | Li et al. |
| 8,262,919 B1 | 9/2012 | Luo et al. |
| 8,264,797 B2 | 9/2012 | Emley |
| 8,264,798 B1 | 9/2012 | Guan et al. |
| 8,270,126 B1 | 9/2012 | Roy et al. |
| 8,276,258 B1 | 10/2012 | Tran et al. |
| 8,277,669 B1 * | 10/2012 | Chen et al. ................ 216/22 |
| 8,279,719 B1 | 10/2012 | Hu et al. |
| 8,284,517 B1 | 10/2012 | Sun et al. |
| 8,288,204 B1 | 10/2012 | Wang et al. |
| 8,289,821 B1 | 10/2012 | Huber |
| 8,291,743 B1 | 10/2012 | Shi et al. |
| 8,307,539 B1 | 11/2012 | Rudy et al. |
| 8,307,540 B1 | 11/2012 | Tran et al. |
| 8,308,921 B1 | 11/2012 | Hiner et al. |
| 8,310,785 B1 | 11/2012 | Zhang et al. |
| 8,310,901 B1 | 11/2012 | Batra et al. |
| 8,315,019 B1 | 11/2012 | Mao et al. |
| 8,316,527 B2 | 11/2012 | Hong et al. |
| 8,320,076 B1 | 11/2012 | Shen et al. |
| 8,320,077 B1 | 11/2012 | Tang et al. |
| 8,320,219 B1 | 11/2012 | Wolf et al. |
| 8,320,220 B1 | 11/2012 | Yuan et al. |
| 8,320,722 B1 | 11/2012 | Yuan et al. |
| 8,322,022 B1 | 12/2012 | Yi et al. |
| 8,322,023 B1 | 12/2012 | Zeng et al. |
| 8,325,569 B1 | 12/2012 | Shi et al. |
| 8,333,008 B1 | 12/2012 | Sin et al. |
| 8,334,093 B2 | 12/2012 | Zhang et al. |
| 8,336,194 B2 | 12/2012 | Yuan et al. |
| 8,339,738 B1 | 12/2012 | Tran et al. |
| 8,341,826 B1 | 1/2013 | Jiang et al. |
| 8,343,319 B1 | 1/2013 | Li et al. |
| 8,343,364 B1 | 1/2013 | Gao et al. |
| 8,349,195 B1 | 1/2013 | Si et al. |
| 8,351,307 B1 | 1/2013 | Wolf et al. |
| 8,355,222 B2 * | 1/2013 | Mino et al. .............. 360/125.3 |
| 8,357,244 B1 | 1/2013 | Zhao et al. |
| 8,373,945 B1 | 2/2013 | Luo et al. |
| 8,375,564 B1 | 2/2013 | Luo et al. |
| 8,375,565 B2 | 2/2013 | Hu et al. |
| 8,381,391 B2 | 2/2013 | Park et al. |
| 8,385,157 B1 | 2/2013 | Champion et al. |
| 8,385,158 B1 | 2/2013 | Hu et al. |
| 8,394,280 B1 | 3/2013 | Wan et al. |

(56) References Cited

U.S. PATENT DOCUMENTS

| | | | |
|---|---|---|---|
| 8,400,731 B1 | 3/2013 | Li et al. | |
| 8,400,733 B2 * | 3/2013 | Shin et al. ............... | 360/125.15 |
| 8,404,128 B1 | 3/2013 | Zhang et al. | |
| 8,404,129 B1 | 3/2013 | Luo et al. | |
| 8,405,930 B1 | 3/2013 | Li et al. | |
| 8,409,453 B1 | 4/2013 | Jiang et al. | |
| 8,413,317 B1 | 4/2013 | Wan et al. | |
| 8,416,540 B1 | 4/2013 | Li et al. | |
| 8,419,953 B1 | 4/2013 | Su et al. | |
| 8,419,954 B1 | 4/2013 | Chen et al. | |
| 8,422,176 B1 | 4/2013 | Leng et al. | |
| 8,422,342 B1 | 4/2013 | Lee | |
| 8,422,841 B1 | 4/2013 | Shi et al. | |
| 8,424,192 B1 | 4/2013 | Yang et al. | |
| 8,441,756 B1 | 5/2013 | Sun et al. | |
| 8,443,510 B1 | 5/2013 | Shi et al. | |
| 8,444,866 B1 | 5/2013 | Guan et al. | |
| 8,449,948 B2 | 5/2013 | Medina et al. | |
| 8,451,556 B1 | 5/2013 | Wang et al. | |
| 8,451,563 B1 | 5/2013 | Zhang et al. | |
| 8,454,846 B1 | 6/2013 | Zhou et al. | |
| 8,455,119 B1 | 6/2013 | Jiang et al. | |
| 8,456,961 B1 | 6/2013 | Wang et al. | |
| 8,456,963 B1 | 6/2013 | Hu et al. | |
| 8,456,964 B1 | 6/2013 | Yuan et al. | |
| 8,456,966 B1 | 6/2013 | Shi et al. | |
| 8,456,967 B1 | 6/2013 | Mallary | |
| 8,458,892 B2 | 6/2013 | Si et al. | |
| 8,462,592 B1 | 6/2013 | Wolf et al. | |
| 8,468,682 B1 | 6/2013 | Zhang | |
| 8,470,186 B2 | 6/2013 | Chen et al. | |
| 8,472,288 B1 | 6/2013 | Wolf et al. | |
| 8,480,911 B1 | 7/2013 | Osugi et al. | |
| 8,486,285 B2 | 7/2013 | Zhou et al. | |
| 8,486,286 B1 | 7/2013 | Gao et al. | |
| 8,488,272 B1 | 7/2013 | Tran et al. | |
| 8,491,801 B1 | 7/2013 | Tanner et al. | |
| 8,491,802 B1 | 7/2013 | Gao et al. | |
| 8,493,693 B1 | 7/2013 | Zheng et al. | |
| 8,493,695 B1 | 7/2013 | Kaiser et al. | |
| 8,495,813 B1 | 7/2013 | Hu et al. | |
| 8,498,084 B1 | 7/2013 | Leng et al. | |
| 8,506,828 B1 | 8/2013 | Osugi et al. | |
| 8,514,517 B1 | 8/2013 | Batra et al. | |
| 8,518,279 B1 | 8/2013 | Wang et al. | |
| 8,518,832 B1 | 8/2013 | Yang et al. | |
| 8,520,336 B1 | 8/2013 | Liu et al. | |
| 8,520,337 B1 | 8/2013 | Liu et al. | |
| 8,524,068 B2 | 9/2013 | Medina et al. | |
| 8,526,275 B1 | 9/2013 | Yuan et al. | |
| 8,531,801 B1 | 9/2013 | Xiao et al. | |
| 8,532,450 B1 | 9/2013 | Wang et al. | |
| 8,533,937 B1 | 9/2013 | Wang et al. | |
| 8,537,494 B1 | 9/2013 | Pan et al. | |
| 8,537,495 B1 | 9/2013 | Luo et al. | |
| 8,537,502 B1 | 9/2013 | Park et al. | |
| 8,545,999 B1 | 10/2013 | Leng et al. | |
| 8,547,659 B1 | 10/2013 | Bai et al. | |
| 8,547,667 B1 | 10/2013 | Roy et al. | |
| 8,547,730 B1 | 10/2013 | Shen et al. | |
| 8,555,486 B1 | 10/2013 | Medina et al. | |
| 8,559,141 B1 | 10/2013 | Pakala et al. | |
| 8,563,146 B1 | 10/2013 | Zhang et al. | |
| 8,565,049 B1 | 10/2013 | Tanner et al. | |
| 8,576,517 B1 | 11/2013 | Tran et al. | |
| 8,578,594 B2 | 11/2013 | Jiang et al. | |
| 8,582,238 B1 | 11/2013 | Liu et al. | |
| 8,582,241 B1 | 11/2013 | Yu et al. | |
| 8,582,253 B1 | 11/2013 | Zheng et al. | |
| 8,588,039 B1 | 11/2013 | Shi et al. | |
| 8,593,914 B2 | 11/2013 | Wang et al. | |
| 8,597,528 B1 | 12/2013 | Roy et al. | |
| 8,599,520 B1 | 12/2013 | Liu et al. | |
| 8,599,657 B1 | 12/2013 | Lee | |
| 8,603,593 B1 | 12/2013 | Roy et al. | |
| 8,607,438 B1 | 12/2013 | Gao et al. | |
| 8,607,439 B1 | 12/2013 | Wang et al. | |
| 8,611,035 B1 | 12/2013 | Bajikar et al. | |
| 8,611,054 B1 | 12/2013 | Shang et al. | |
| 8,611,055 B1 | 12/2013 | Pakala et al. | |
| 8,614,864 B1 | 12/2013 | Hong et al. | |
| 8,619,512 B1 | 12/2013 | Yuan et al. | |
| 8,625,233 B1 | 1/2014 | Ji et al. | |
| 8,625,941 B1 | 1/2014 | Shi et al. | |
| 8,628,672 B1 | 1/2014 | Si et al. | |
| 8,630,068 B1 | 1/2014 | Mauri et al. | |
| 8,634,280 B1 | 1/2014 | Wang et al. | |
| 8,638,529 B1 | 1/2014 | Leng et al. | |
| 8,643,980 B1 | 2/2014 | Fowler et al. | |
| 8,649,123 B1 | 2/2014 | Zhang et al. | |
| 8,665,561 B1 | 3/2014 | Knutson et al. | |
| 8,670,211 B1 | 3/2014 | Sun et al. | |
| 8,670,213 B1 | 3/2014 | Zeng et al. | |
| 8,670,214 B1 | 3/2014 | Knutson et al. | |
| 8,670,294 B1 | 3/2014 | Shi et al. | |
| 8,670,295 B1 | 3/2014 | Hu et al. | |
| 8,675,318 B1 | 3/2014 | Ho et al. | |
| 8,675,455 B1 | 3/2014 | Krichevsky et al. | |
| 8,681,594 B1 | 3/2014 | Shi et al. | |
| 8,689,430 B1 | 4/2014 | Chen et al. | |
| 8,693,141 B1 | 4/2014 | Elliott et al. | |
| 8,703,397 B1 | 4/2014 | Zeng et al. | |
| 8,705,205 B1 | 4/2014 | Li et al. | |
| 8,711,518 B1 | 4/2014 | Zeng et al. | |
| 8,711,528 B1 | 4/2014 | Xiao et al. | |
| 8,717,709 B1 | 5/2014 | Shi et al. | |
| 8,720,044 B1 * | 5/2014 | Tran et al. ............... | 29/603.14 |
| 8,721,902 B1 | 5/2014 | Wang et al. | |
| 8,724,259 B1 * | 5/2014 | Liu et al. ............... | 360/125.15 |
| 8,749,790 B1 | 6/2014 | Tanner et al. | |
| 8,749,920 B1 | 6/2014 | Knutson et al. | |
| 8,753,903 B1 | 6/2014 | Tanner et al. | |
| 8,760,807 B1 | 6/2014 | Zhang et al. | |
| 8,760,818 B1 | 6/2014 | Diao et al. | |
| 8,760,819 B1 | 6/2014 | Liu et al. | |
| 8,760,822 B1 | 6/2014 | Li et al. | |
| 8,760,823 B1 | 6/2014 | Chen et al. | |
| 8,763,235 B1 | 7/2014 | Wang et al. | |
| 8,780,498 B1 | 7/2014 | Jiang et al. | |
| 8,780,505 B1 | 7/2014 | Xiao | |
| 8,786,983 B1 | 7/2014 | Liu et al. | |
| 8,790,524 B1 | 7/2014 | Luo et al. | |
| 8,790,527 B1 | 7/2014 | Luo et al. | |
| 8,792,208 B1 | 7/2014 | Liu et al. | |
| 8,792,312 B1 | 7/2014 | Wang et al. | |
| 8,793,866 B1 | 8/2014 | Zhang et al. | |
| 8,797,680 B1 | 8/2014 | Luo et al. | |
| 8,797,684 B1 | 8/2014 | Tran et al. | |
| 8,797,686 B1 | 8/2014 | Bai et al. | |
| 8,797,692 B1 | 8/2014 | Guo et al. | |
| 8,813,324 B2 | 8/2014 | Emley et al. | |
| 2008/0278861 A1 * | 11/2008 | Jiang et al. ............... | 360/319 |
| 2010/0078406 A1 * | 4/2010 | Guthrie et al. ............... | 216/22 |
| 2010/0290157 A1 | 11/2010 | Zhang et al. | |
| 2011/0086240 A1 | 4/2011 | Xiang et al. | |
| 2012/0111826 A1 | 5/2012 | Chen et al. | |
| 2012/0125885 A1 * | 5/2012 | Chen et al. ............... | 216/22 |
| 2012/0216378 A1 | 8/2012 | Emley et al. | |
| 2012/0237878 A1 | 9/2012 | Zeng et al. | |
| 2012/0298621 A1 | 11/2012 | Gao | |
| 2013/0022840 A1 * | 1/2013 | Hsiao et al. ............... | 428/815.2 |
| 2013/0078483 A1 * | 3/2013 | Chen et al. ............... | 428/815 |
| 2013/0216702 A1 | 8/2013 | Kaiser et al. | |
| 2013/0216863 A1 | 8/2013 | Li et al. | |
| 2013/0257421 A1 | 10/2013 | Shang et al. | |
| 2014/0154529 A1 | 6/2014 | Yang et al. | |
| 2014/0175050 A1 | 6/2014 | Zhang et al. | |

OTHER PUBLICATIONS

Office Action dated Sep. 17, 2013 from U.S. Appl. No. 13/493,903, 8 pages.

* cited by examiner

FIG. 4   Side View

CONFORMAL HIGH MOMENT SIDE SHIELD SEED LAYER FOR PERPENDICULAR MAGNETIC RECORDING WRITER

CROSS REFERENCE TO RELATED APPLICATION(S)

This application is a divisional of application Ser. No. 13/493,903 filed on Jun. 11, 2012, which is hereby incorporated by reference.

BACKGROUND OF THE INVENTION

Disk drives typically use heads residing on sliders to read from and write to the magnetic media. Read and write transducers residing in the head are flown at a small, controlled spacing above the magnetic medium (disk) during read and write operations. An air bearing forms between the head and the disk due to the disk rotating at high speeds to provide controlled head to disk spacing. Magnetic fields emanating from the write transducer pole tip switches magnetization of the magnetic medium, i.e., writing to the medium. Among other factors, a smaller and more tightly controlled magnetic writing field will allow more data to be written in the same space, thereby increasing areal density.

Figure 1:
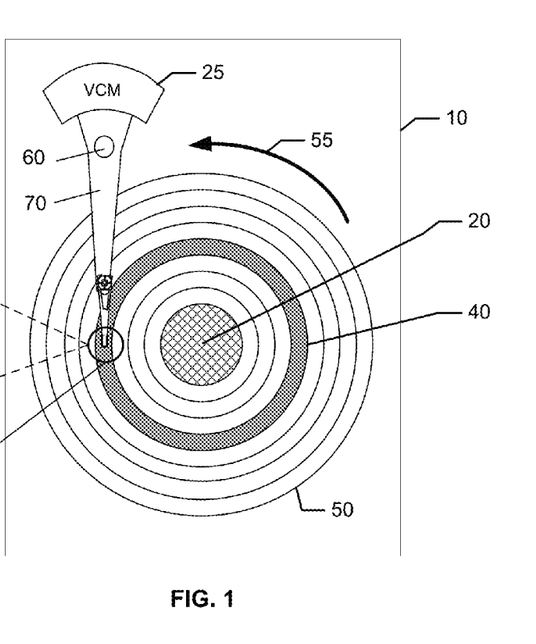
FIGS. 1 and 1a illustrate a top view of conventional hard disk drive.

FIG. 1 illustrates a conventional disk drive 10 used for data storage. Figures are not drawn to scale and only certain structures are depicted for clarity. Disk media 50 is attached to spindle motor and hub 20. The spindle motor and hub 20 rotate the media 50 in a direction shown by arrow 55. Head stack assembly (HSA) 60 includes a magnetic recording head 30 on actuator arm 70 and positions actuator arm 70 by positioning the voice coil motor (VCM) 25 over a desired data track, shown as recording track 40 in this example, to write data onto the media 50.

Figure 1A:
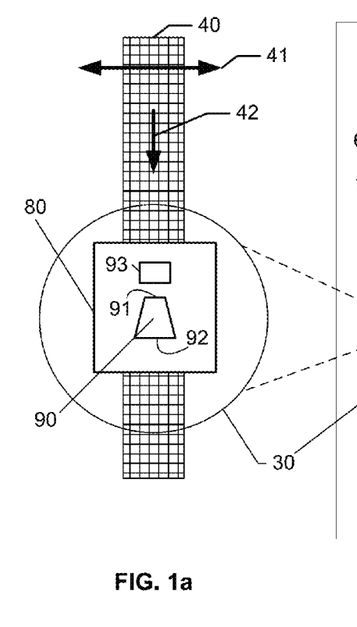
Figure 2:
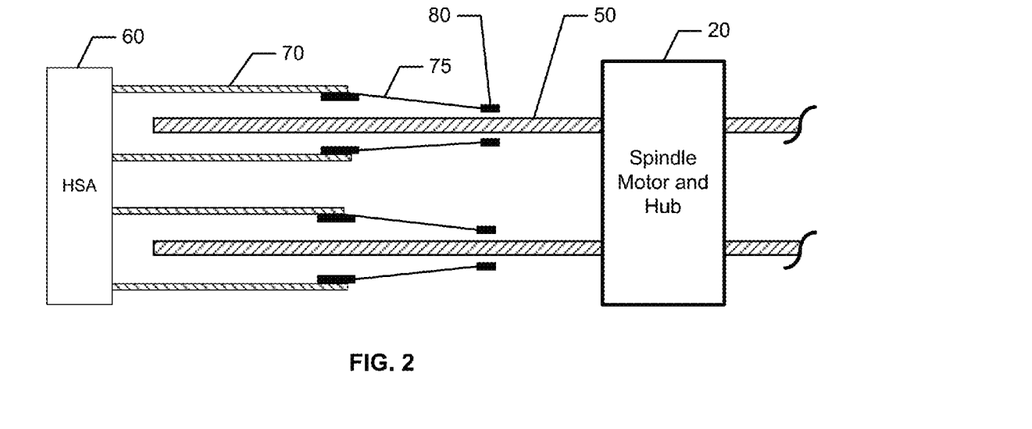
FIG. 2 illustrates a side view of a conventional hard disk drive

FIG. 1a illustrates an enlarged view of a section of FIG. 1 including head 30 and track 40. A magnetic recording transducer 90 is fabricated on slider 80. Slider 80 may be attached to suspension 75 and suspension 75 may be attached to actuator arm 70 as shown in FIG. 2. A read transducer 93 is also fabricated on slider 80.

Referring again to FIG. 2, Slider 80 is illustrated above recording track 40. Media 50 and track 40 are moving under slider 80 in a down-track direction shown by arrow 42. The cross-track direction is shown by arrow 41.

The magnetic recording transducer 90 has a leading edge 91 and a trailing edge 92. In this embodiment, the trailing edge 92 of recording transducer 90 is the final portion of magnetic transducer 90 that writes onto the recording track 40 as the media moves under the slider 80 in down-track direction 42.

FIG. 2 illustrates a side view of the disk drive 10 shown in FIG. 1. At least one disk media 50 is mounted onto spindle motor and hub 20. HSA 60 comprises at least one actuator arm 70 that carries suspension 75 and slider 80. Slider 80 has an air bearing surface (ABS) facing media 50. When the media is rotating and actuator arm 70 is positioned over the media 50, slider 80 floats above media 50 by aerodynamic pressure created between the slider ABS and the surface of media 50 facing the ABS of slider 80.

DETAILED DESCRIPTION OF THE INVENTION

Figure 3:
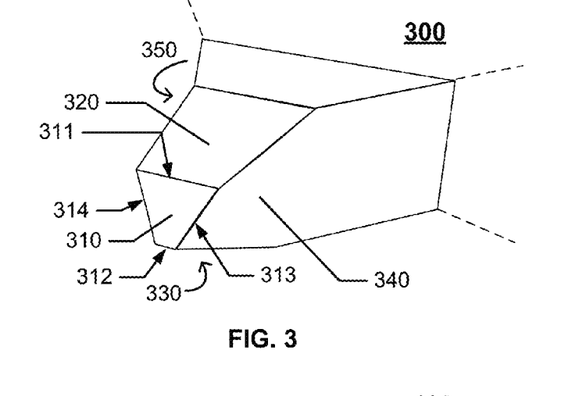
FIG. 3 illustrates a perspective view of a main pole tip section of a perpendicular magnetic recording transducer in accordance with one aspect of the subject invention.

In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail to avoid unnecessarily obscuring the present invention. References to top, side, bottom, or similar terms are used for descriptive purposes with reference to the figures and descriptions and should not be taken as limiting the scope of the invention FIG. 3 illustrates a perspective view of a main pole tip section 300 of a perpendicular magnetic recording transducer in accordance with one aspect of the subject invention. Main pole tip section 300 has a pole tip face 310 that faces the ABS. Pole tip face 310 is illustrated in a trapezoidal shape having a trailing edge 311, leading edge 312, first side wall edge 313, and second side wall edge 314. First side wall 340 extends distally from the first side wall edge 313, second side wall 350 (not visible, opposite first side wall 340) extends distally from second side wall edge 314, trailing side wall 320 extends distally from trailing edge 311, and leading side wall 330 (not visible, opposite trailing side wall 320) extends distally from leading edge 312.

Main pole tip section 300 is illustrated with a trapezoidal shape at the ABS with trailing edge 311 wider than leading edge 312; however, other shapes may also be used within the scope of the invention. In other embodiments, for example, side wall edge 313 and side wall edge 314 and corresponding side wall 340 and side wall 350 may have facets or a curved shape; the leading edge 312 may be small, or form a point; and a trapezoid shape is not required, and may be a rectangle, or another shape having side walls. Pole surfaces and edges illustrated with straight lines may also be implemented as curved or faceted. One ordinarily skilled in the art will recognize that these shapes, combinations or variations of these shapes, and other shapes may be used without departing from the spirit of the invention.

Figure 4:
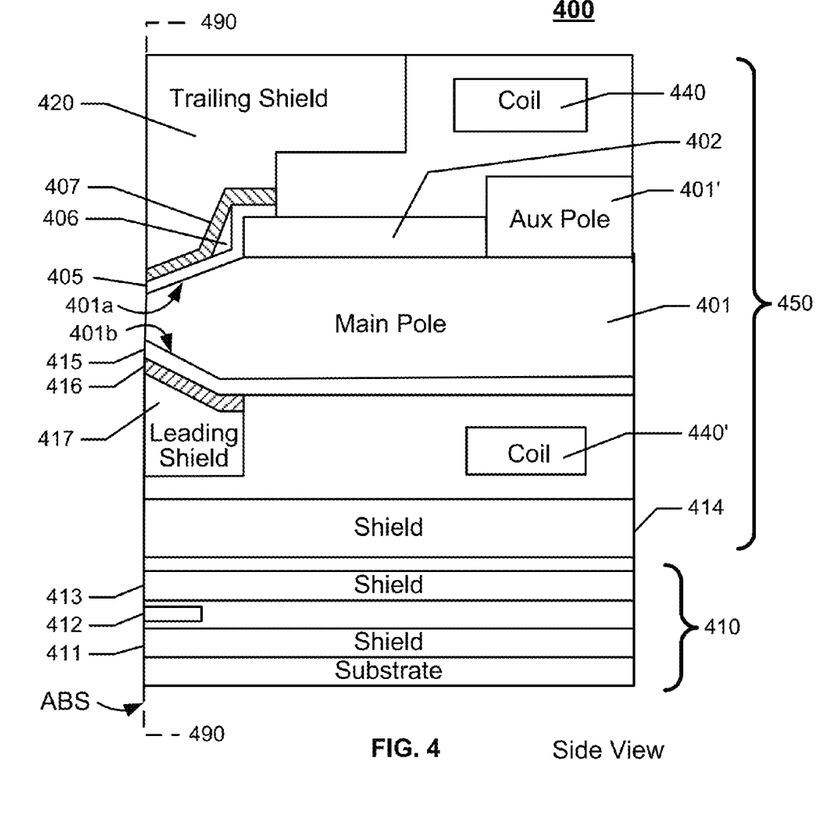
FIG. 4 illustrates a section of a side view of a read/write head in accordance with one aspect of the subject invention.

FIG. 4 illustrates an embodiment of the invention in a side section view of read/write head 400 incorporating a write transducer 450 and read sensor 410, both facing the ABS 490. The read sensor 410 may include shield 411 and shield 413 as well as sensor 412. Write transducer 450 includes shield 414, main pole 401, assist pole (or auxiliary pole) 401', coil 440 and coil 440', leading shield 417 and trailing shield 420. Side shields are not shown in this sectional view, however reside on the sides of main pole 401 and will be described in the following figures and descriptions. Main pole 401 has trailing bevel 401a and a leading bevel 401b. A leading nonmagnetic gap layer 415 separates main pole 401 from underlying structures, and trailing nonmagnetic gap layer 405 separates main pole 401 from structures above. A spacer 406 may be included on a portion of trailing bevel 401a to provide magnetic separation between main pole 401 and magnetic structures above. A nonmagnetic spacer layer 402 is illustrated on the non-beveled section of main pole 401; however, may be provided above main pole 401 beginning at any point distal from the ABS 490, including on bevel 401a. In one aspect of the invention, trailing seed layer 407 overlays trailing nonmagnetic gap layer 405 and spacer 406. In another aspect of the invention, leading seed layer 416 is provided between leading nonmagnetic gap layer 415 and leading shield 417.

In aspects of some embodiments of the invention, trailing seed layer 407 and leading seed layer 416 comprise a first magnetic material having a magnetic moment ($B_s$) between 2.0 Tesla (T) and 2.4 T. In another aspect of the invention, the trailing shield 420 and leading shield 417 comprise a second magnetic material having a $B_s$ of between 1.0 T and 2.0 T. In another aspect of the invention the second magnetic material has a $B_s$ less than the $B_s$ of the first magnetic material.

In one aspect of the invention the first magnetic material is deposited by physical vapor deposition (PVD), and in another aspect of the invention the first magnetic material is deposited by ion beam deposition (IBD). In another aspect of the invention, the second magnetic material is deposited by electroplating.

Figure 5:
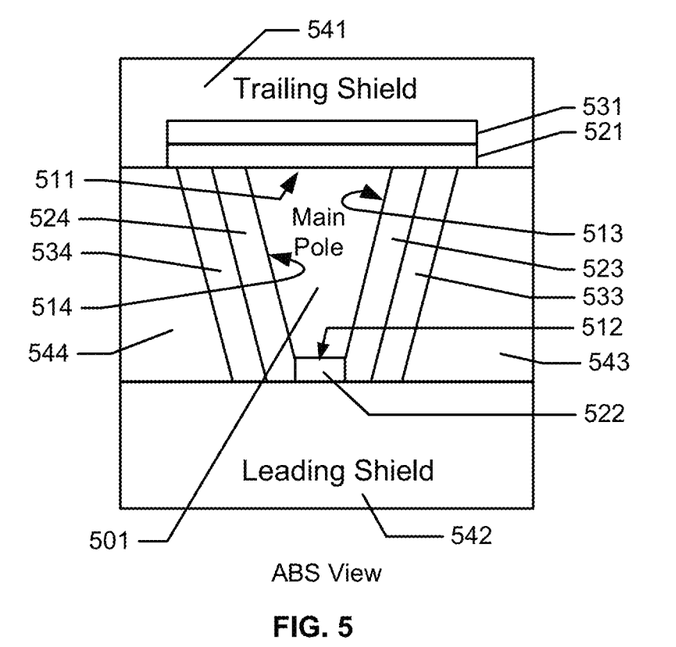
FIG. 5 illustrates an ABS view of a section of a perpendicular magnetic recording transducer in accordance with one aspect of the subject invention.

FIG. 5 illustrates an ABS view of a write transducer similar to write transducer 450 illustrated in FIG. 4. The ABS view is the view looking at the pole tip face from the viewpoint of the media surface. Main pole 501 has trailing side wall 511, leading side wall 512, first side wall 513 and second side wall 514; each corresponding respectively to trailing side wall 320, leading side wall 330, first side wall 340, and second side wall 350, as shown in main pole tip section 300 in FIG. 3.

Continuing with FIG. 5, a trailing side wall nonmagnetic gap layer 521 is disposed on the trailing side wall 511; a leading side wall nonmagnetic gap layer 522 is disposed on leading side wall 512; a first side wall nonmagnetic gap layer 523 is disposed on first side wall 513, and a second side wall nonmagnetic gap layer 524 is disposed on second side wall 514. Trailing side wall nonmagnetic gap layer 521 corresponds to trailing nonmagnetic gap layer 405 in read/write head 400 in FIG. 4, and leading side wall nonmagnetic gap layer 522 corresponds to leading nonmagnetic gap layer 415 in read/write head 400 in FIG. 4.

A trailing seed layer 531 is deposited on trailing side wall nonmagnetic gap layer 521; a first side seed layer 533 is deposited on first side wall nonmagnetic gap layer 523, and a second side seed layer 534 is deposited on the second side wall nonmagnetic gap layer 524.

In aspects of some embodiments of the invention, trailing seed layer 531, first side seed layer 533, and second side seed layer 534 comprise a first magnetic material having a magnetic moment ($B_s$) between 2.0 T and 2.4 T.

In one aspect of the invention, first side seed layer 533 and second side seed layer 534 have a layer thickness between 25 nanometers (nm) and 50 nm.

Trailing shield 541 is disposed on the trailing seed layer 531; leading shield 542 is disposed under leading side wall nonmagnetic gap layer 522; first side shield 543 is disposed alongside first side seed layer 533, and second side shield 544 is disposed alongside second side seed layer 534. In one aspect of the invention, trailing shield 541, leading shield 542, first side shield 543, and second side shield 544 may be deposited by electroplating. In one embodiment, trailing shield 541, first side shield 543, and second side shield 544 may be electroplated together in a single plating, and in another aspect of the invention, may form a monolithic structure. In a further embodiment, the electroplating may include leading shield 542 in the same electroplating process. In other aspects of the invention, the shields may be plated separately, and/or with different process parameters.

In another aspect of the invention, the trailing shield 541, leading shield 542, first side shield 543, and second side shield 544 comprise a second magnetic material having a $B_s$ of between 1.0 T and 2.0 T. The first magnetic material and the second magnetic material may comprise a different composition such as differing amounts of iron; and/or may have different magnetic moments due to the method of depositing them, such as IBE, IBD, or electroplating; or by varying the process parameters, such as deposition power or plating current. In another aspect of the invention the second magnetic material has a $B_s$ less than the $B_s$ of the first magnetic material. In a further aspect of the invention, the second magnetic material of the shields 541-544 has a $B_s$ less than the $B_s$ of the first magnetic material of the seed layers 531, 533 and 534, and the second magnetic material has a $B_s$ that increases or decreases with distance from any of the first side seed layer 533 or the second side seed layer 534. A $B_s$ that decreases with distance may provide a reduction of unwanted side shield flux and reduce adjacent track writing. A $B_s$ that increases with distance may provide flux shaping.

In one aspect of the invention the first magnetic material is deposited by physical vapor deposition (PVD), and in another aspect of the invention the first magnetic material is deposited by ion beam deposition (IBD). In another aspect of the invention, the second magnetic material is deposited by electroplating. In yet another aspect, the side shields are plated first, and the trailing shield plated separately.

The addition of a high moment side shield layer that is conformal to the writer pole and separated by a nonmagnetic gap provides advantageous magnetic properties for writing to magnetic medium. The high moment side shield optimizes the write field profile, particularly sharp field contours on the track edge write field without penalizing on-track write field. By improving the side field gradient, adjacent track interference may be reduced, while preserving comparable on-track reverse-overwrite performance. As one result, narrower side gaps, for example side gaps less than 60 nm, may be achieved, as well as maintaining a sufficient write field.

Figure 6:
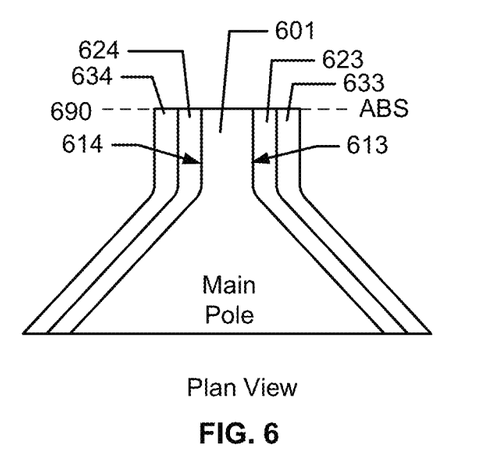
FIG. 6 illustrates a plan view of a section of a perpendicular magnetic recording transducer in accordance with one aspect of the subject invention.

FIG. 6 illustrates a plan view of a section of a perpendicular magnetic recording transducer in accordance with one aspect of the subject invention. The plan view illustrated in FIG. 6 is a section through a main pole analogous to the main pole 501 illustrated in FIG. 5 as viewed from a top perspective, (i.e., a section from the first side shield 543 to the second side shield 544). Main pole 601 has a first side wall 613 and second side wall 614, each extending distally from ABS 690. First side wall nonmagnetic gap layer 623 is adjacent side wall 613 and second side wall nonmagnetic gap layer 624 is adjacent second side wall 614. First side seed layer 633 is on first side wall nonmagnetic gap layer 623, and second side seed layer 634 is on second side wall nonmagnetic gap layer 624.

Figure 7:
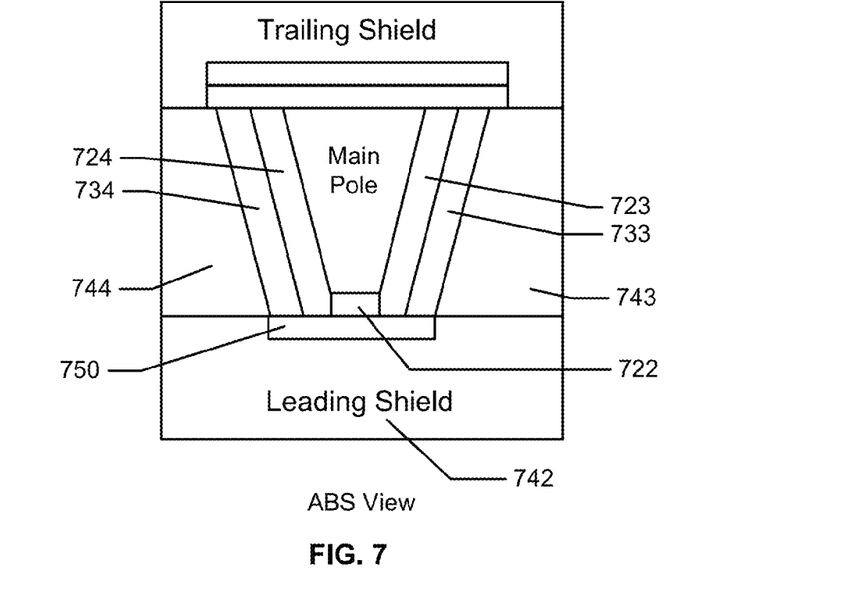
FIG. 7 illustrates an ABS view of a section of a perpendicular magnetic recording transducer in accordance with one aspect of the subject invention.

FIG. 7 illustrates an ABS view of a section of a perpendicular magnetic recording transducer in accordance with one aspect of the subject invention. The embodiment illustrated in FIG. 7 is similar to the embodiment described in FIG. 5, however, with the addition of leading seed layer 750. In one aspect of the invention, leading seed layer 750 is deposited below leading nonmagnetic gap layer 722, first side wall nonmagnetic gap layer 723, and second side wall nonmagnetic gap layer 724. In another aspect, leading seed layer 750 is in contact with first side wall seed layer 733 and second side wall seed layer 724. In one aspect of the invention, leading seed layer 750 is formed of a first magnetic material having a magnetic moment ($B_s$) between 2.0 T and 2.4 T. In another aspect of the invention, leading shield 742, first side shield 743, and second side shield 744 comprise a second magnetic material having a $B_s$ of between 1.0 T and 2.0 T. In another aspect of the invention the second magnetic material has a $B_s$ less than the $B_s$ of the first magnetic material.

Figure 8:
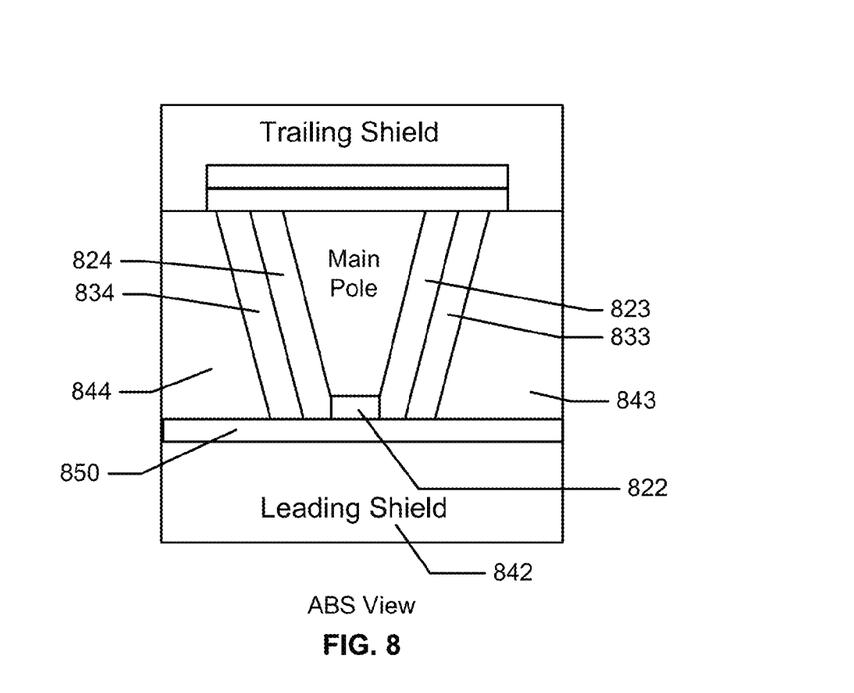
FIG. 8 illustrates an ABS view of a section of a perpendicular magnetic recording transducer in accordance with one aspect of the subject invention.

FIG. 8 illustrates an ABS view of a section of a perpendicular magnetic recording transducer in accordance with one aspect of the subject invention. The embodiment illustrated in FIG. 8 is similar to the embodiment described in FIG. 5, however, with the addition of a leading seed layer 850 between the leading shield 842 and first side shield 843, and also between leading shield 842 and second side shield 844. In one aspect of the invention, leading seed layer 850 is formed of a first magnetic material having a magnetic moment ($B_s$) between 2.0 T and 2.4 T. In another aspect of the invention, leading shield 842, first side shield 843, and second side shield 844 comprise a second magnetic material having a $B_s$ of between 1.0 T and 2.0 T. In another aspect of the invention the second magnetic material has a $B_s$ less than the $B_s$ of the first magnetic material.

Other and/or different components may be fabricated in other embodiments. For example, in some embodiments, coupling layers, stop layers and/or seed layers may also remain between layers as part of the fabrication process.

The description of the invention is provided to enable any person ordinarily skilled in the art to practice the various embodiments described herein. While the present invention has been particularly described with reference to the various figures and embodiments, it should be understood that these are for illustration purposes only and should not be taken as limiting the scope of the invention.

There may be many other ways to implement the invention. Various functions and elements described herein may be partitioned differently from those shown without departing from the spirit and scope of the invention. Various modifications to these embodiments will be readily apparent to those ordinarily skilled in the art, and generic principles defined herein may be applied to other embodiments. Thus, many changes and modifications may be made to the invention, by one having ordinary skill in the art, without departing from the spirit and scope of the invention.

A reference to an element in the singular is not intended to mean "one and only one" unless specifically stated, but rather "one or more." The term "some" refers to one or more. Underlined and/or italicized headings and subheadings are used for convenience only, do not limit the invention, and are not referred to in connection with the interpretation of the description of the invention. All structural and functional equivalents to the elements of the various embodiments of the invention described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

We claim:

1. A recording transducer for use in a data storage device, the recording transducer comprising a magnetic writer pole, the magnetic writer pole having a pole tip facing an air bearing surface (ABS):
   the pole tip comprising a pole face, leading side wall, a trailing side wall, a first side wall and a second side wall;
   the recording transducer further comprising:
   a trailing side wall nonmagnetic gap layer deposited on the trailing side wall, a first side wall nonmagnetic gap layer deposited on the first side wall, and a second side wall nonmagnetic gap layer deposited on the second side wall;
   a trailing seed layer comprising a first magnetic material deposited on the trailing side wall nonmagnetic gap layer;
   a first side seed layer comprising the first magnetic material deposited on the first side wall nonmagnetic gap layer,
   a second side seed layer comprising the first magnetic material deposited on the second side wall nonmagnetic gap layer;
   wherein the first magnetic material has a magnetic moment ($B_s$) between 2.0 T and 2.4 T;
   a leading shield comprising a second magnetic material deposited on a leading seed layer;
   a first side shield comprising the second magnetic material deposited on the first side seed layer; and
   a second side shield comprising the second magnetic material deposited on the second side seed layer;
   wherein the second magnetic material has a $B_s$ between 1.0 T and 2.0 T, and the second magnetic material having a $B_s$ lower than the $B_s$ of the first magnetic material.

2. The recording transducer of claim 1 wherein the second magnetic material further comprises:
   a $B_s$ lower than the $B_s$ of the first magnetic material, and
   a $B_s$ that increases with distance from any of the first side seed layer or the second side seed layer.

3. The recording transducer of claim 1 wherein the second magnetic material further comprises:
   a $B_s$ lower than the $B_s$ of the first magnetic material, and
   a $B_s$ that decreases with distance from any of the first side seed layer or the second side seed layer.

4. The recording transducer of claim 1 wherein the leading shield comprises a second magnetic material having a $B_s$ between 1.0 T and 2.0 T, wherein the second magnetic material has a $B_s$ lower than the $B_s$ of the first magnetic material.

5. The recording transducer of claim 1 wherein the leading shield, first side shield, and second side shield are plated in a single plating.

6. The recording transducer of claim 1 further comprising:
   a leading side wall nonmagnetic gap layer deposited on the leading side wall;
   a leading seed layer comprising the first magnetic material deposited on the leading side wall nonmagnetic gap layer;
   wherein the first magnetic material has a magnetic moment ($B_s$) between 2.0 T and 2.4 T.

7. The recording transducer of claim 6 further comprising a leading shield comprising a second magnetic material deposited on the leading seed layer, wherein the second magnetic material has a $B_s$ between 1.0 T and 2.0 T, and the second magnetic material having a $B_s$ lower than the $B_s$ of the first magnetic material.

8. The recording transducer of claim 7 wherein the second magnetic material further comprises:
   a $B_s$ that increases with distance from any of the first side seed layer, the second side seed layer, or the leading seed layer.

9. The recording transducer of claim 7 wherein the second magnetic material further comprises:

a $B_s$ that decreases with distance from any of the first side seed layer, the second side seed layer, or the leading seed layer.

10. The recording transducer of claim 6 wherein the leading seed layer has a thickness of between 25 nanometers (nm) and 50 nm.

11. The recording transducer of claim 6 wherein the first magnetic material is deposited by physical vapor deposition (PVD) or ion beam deposition (IBD).

12. The recording transducer of claim 1 further comprising:
   a trailing shield comprising a second magnetic material deposited on the trailing seed layer;
   a first side shield comprising the second magnetic material deposited on the first side seed layer;
   a second side shield comprising the second magnetic material deposited on the second side seed layer;
   a leading shield;
   a leading edge nonmagnetic gap layer between the leading wall of the pole tip and a leading shield seed layer;
   wherein the leading shield seed layer comprises the first magnetic material, and
   the second magnetic material has a $B_s$ between 1.0 T and 2.0 T, wherein the second magnetic material has a $B_s$ lower than the $B_s$ of the first magnetic material.

13. The recording transducer of claim 12 wherein the leading shield seed layer further resides in a position between the leading shield and each of the first side shield and the second side shield.

14. A disk drive comprising:
   a slider including a recording transducer, the recording transducer including a writer pole, the writer pole having a pole tip facing an air bearing surface (ABS);
   the pole tip comprising a pole face, leading side wall, a trailing side wall, a first side wall and a second side wall;
   the recording transducer further comprising:
   a trailing side wall nonmagnetic gap layer on the trailing side wall, a first side wall nonmagnetic gap layer deposited on the first side wall, and a second side wall nonmagnetic gap layer deposited on the second side wall;
   a trailing seed layer comprising a first magnetic material deposited on the trailing side wall nonmagnetic gap layer;
   a first side seed layer comprising the first magnetic material deposited on the first side wall nonmagnetic gap layer,
   a second side seed layer comprising the first magnetic material deposited on the second side wall nonmagnetic gap layer;
   wherein the first magnetic material has a magnetic moment ($B_s$) between 2.0 T and 2.4 T;
   a leading shield comprising a second magnetic material deposited on a leading seed layer;
   a first side shield comprising the second magnetic material deposited on the first side seed layer; and
   a second side shield comprising the second magnetic material deposited on the second side seed layer;
   wherein the second magnetic material has a $B_s$ between 1.0 T and 2.0 T, and the second magnetic material having a $B_s$ lower than the $B_s$ of the first magnetic material.

15. The recording transducer of claim 14 wherein the first side wall seed layer and second side wall seed layer each have a thickness of between 25 nanometers (nm) and 50 nm, and the first magnetic material is deposited by physical vapor deposition (PVD) or ion beam deposition (IBD).

16. The recording transducer of claim 14 further comprising:
   a leading shield comprising a second magnetic material deposited on the leading seed layer;
   a first side shield comprising the second magnetic material deposited on the first side seed layer;
   a second side shield comprising the second magnetic material deposited on the second side seed layer;
   wherein the second magnetic material has a $B_s$ between 1.0 T and 2.0 T, and the second magnetic material having a $B_s$ lower than the $B_s$ of the first magnetic material.

17. The recording transducer of claim 14 wherein the second magnetic material further comprises:
   a $B_s$ lower than the $B_s$ of the first magnetic material, and
   a $B_s$ that increases or decreases with distance from any of the first side seed layer or the second side seed layer.

\* \* \* \* \*